(12) United States Patent  (10) Patent No.: US 8,384,862 B2
Imaoku et al.  (45) Date of Patent: Feb. 26, 2013

(54) PRODUCTION METHOD OF NANOIMPRINT FILM, DISPLAY DEVICE, AND LIQUID CRYSTAL DISPLAY DEVICE

(75) Inventors: Takao Imaoku, Osaka (JP); Tokio Taguchi, Osaka (JP); Hidekazu Hayashi, Osaka (JP); Kazuhiko Tsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 301 days.

(21) Appl. No.: 12/735,298

(22) PCT Filed: Nov. 7, 2008

(86) PCT No.: PCT/JP2008/070307
§ 371 (c)(1),
(2), (4) Date: Jun. 30, 2010

(87) PCT Pub. No.: WO2009/118943
PCT Pub. Date: Oct. 1, 2009

(65) Prior Publication Data
US 2010/0291317 A1   Nov. 18, 2010

(30) Foreign Application Priority Data
Mar. 24, 2008  (JP) .................................. 2008-076473

(51) Int. Cl.
*G02F 1/1333* (2006.01)
(52) U.S. Cl. ....................................... 349/122
(58) Field of Classification Search .................. None
See application file for complete search history.

(56) References Cited

U.S. PATENT DOCUMENTS 6,888,676 B2 * 5/2005 Parikka et al. ............ 359/487.02
2002/0044356 A1 4/2002 Arakawa et al.
2003/0011315 A1 * 1/2003 Ito et al. ...................... 315/169.3
2006/0050387 A1 3/2006 Arakawa et al.
2008/0032058 A1 2/2008 Arakawa et al.
2010/0062217 A1 * 3/2010 Kurematsu ................... 428/141
2010/0255291 A1 * 10/2010 Iwata et al. .................. 428/332

FOREIGN PATENT DOCUMENTS

| JP | 2001-264520 | 9/2001 |
| JP | 2004-205990 | 7/2004 |
| JP | 2006-039450 | 2/2006 |
| JP | 2006-062240 | 3/2006 |
| WO | WO 2007/040023 | 4/2007 |

OTHER PUBLICATIONS

International Search Report, Jan. 19, 2009.

* cited by examiner

*Primary Examiner* — Sung Pak
(74) *Attorney, Agent, or Firm* — Harness, Dickey & Pierce, P.L.C.

(57) ABSTRACT

A method is disclosed for efficiently producing a nanoimprint film with high-accurately formed nanostructures even if a base on which the nanoimprint film is formed is capable of absorbing UV light. The production method of at least one embodiment of the present invention is a production method of a nanoimprint film formed on a base, the nanoimprint film having a surface with nanosized protrusions and recesses formed thereon. In at least one embodiment, the production method includes a first step of applying a UV-curable resin on a base containing a UV-absorbing component to form a film; a second step of irradiating the film with UV light from a top-side surface of the film to form a semi-cured film; a third step of imprinting nanosized protrusions and recesses on the semi-cured film to form a film having a surface with protrusions and recesses formed thereon; and a fourth step of curing the film with protrusions and recesses to form a nanoimprint film.

12 Claims, 2 Drawing Sheets

PRODUCTION METHOD OF NANOIMPRINT FILM, DISPLAY DEVICE, AND LIQUID CRYSTAL DISPLAY DEVICE

TECHNICAL FIELD

The present invention is directed to production methods of nanoimprint films, display devices, and liquid crystal display (LCD) devices. More particularly, the present invention is directed to a method of producing a nanoimprint film suitably used as an anti-reflection film that shows a low reflectance on the display surface of a display device, and a display device and a liquid crystal display device each including the nanoimprint film on the display surface.

BACKGROUND ART

Displays such as CRT (cathode ray tube) displays, LCDs (liquid crystal displays), PDPs (plasma display panels), EL (electroluminescent) displays are each required to have a display surface provided with various functions of anti-scratch, anti-reflection for ambient light, anti-soil, and the like. To the display surface of these displays, protective members such as a protective film are attached in some cases. As this protective film, one showing anti-reflection for ambient light is used, thereby giving the needed functions to the display surface at one time.

TAC (triacetyl cellulose), which scarcely has birefringence and is excellent in moisture permeability and high adhesion, is often used as a material for the protective film. It is known that for anti-reflection of ambient light, for example, this TAC film is provided with AG (anti-glare) treatment or LR (low reflection) treatment. According to the AG treatment, fine grooves are formed on the TAC film surface, and by utilizing light scattering effects, the anti-reflection is achieved. According to the LR treatment, a material with a refractive index different from that of the TAC film is applied on the TAC film, and by utilizing the effect of interference of light reflected by the TAC film surface and light reflected on the applied material surface, the anti-reflection is achieved.

Typically, LCDs include a polarizing plate on the outermost surface facing a user, and the polarizing plate is required to show the above-mentioned functions. Such a polarizing plate is produced by the following method, for example, as disclosed in Patent Document 1. First, a TAC film, which is a base, is fed from a roll and stretched in the longitudinal and/or transverse directions. A PVA (polyvinyl alcohol) film containing iodine molecules adsorbed thereto and oriented in the stretching direction(s) is fed from a roll. The TAC film is attached to one surface of the PVA film. Then another TAC film is attached to the other surface thereof. Thus the PVA film is sandwiched from the both sides by the respective TAC films. Finally, the obtained laminated sheet is subjected to embossing of microstructures.

The stretched PVA film functions as a polarizing film.

As a way of achieving low reflection on the display surface of a display device, a technology of, for example, as disclosed in Patent Document 2, providing the display surface with moth-eye structures composed of finely and closely formed undulated patterns is drawing attention. More specifically, the moth-eye structures include protrusions and recesses, a pitch of which is controlled to a visible light wavelength or smaller, i.e., a nanometer size (several tens to several hundreds nanometers). This allows a refractive index of light incident on the display surface to be continuously changed along the depth of the protrusion and recess. As a result, light reflectance on the display surface can be decreased.

As a method of forming the protrusions and recesses, a technology of transferring nanosized protrusions and recesses of a mold onto a resin material coated on a substrate by pressing the mold to the material surface, so-called nanoimprint technology, is drawing attention now. Thermal nanoimprint and UV (ultraviolet) nanoimprint are known as the nanoimprint technology. According to the UV nanoimprint, for example, a mold with nanosized protrusions and recesses is pressed to a UV-curable resin thin film formed on a transparent substrate to emboss the film with the mold surface pattern, and then the film is cured by UV radiation, thereby producing a nanoimprint film with nanostructures in the inverse shape of the mold surface pattern on the transparent substrate.

[Patent Document 1]
U.S. Pat. No. 6,888,676
[Patent Document 2]
Japanese Kokai Publication No. 2004-205990

DISCLOSURE OF INVENTION

Iodine, which is usually added to a polarizing film, is deteriorated by UV radiation. For prevention of the deterioration, a polarizing plate containing a UV-absorbing agent is used, whereby the iodine, which has been adsorbed and oriented in a PVA film, is protected against UV light. Further, by adding a UV-absorbing agent to a supporting member such as a TAC film, a UV-absorbing supporting member can be obtained.

However, in such a case as in Patent Document 2 where UV light is radiated to the film from the side free from the fine undulated patterns, the UV-absorbing polarizing plate absorbs the UV light. So a UV nanoimprint technology where UV-curable resins are provided with nanosized features can not be employed. The UV radiation can be performed from the side with the nanosized features, but a mold for embossing to the film, and the like, needs to have transparency because the UV radiation is typically performed simultaneously when the mold is pressed to the film.

The present invention has been made in view of the above-mentioned state of the art. The present invention has an object to provide a method of efficiently producing a nanoimprint film with high-accurately formed nanostructures even if a base on which the nanoimprint film is formed is capable of absorbing UV light.

The present inventors made various investigations on a method of producing nanoimprint films using UV radiation. The inventors noted a series of steps: applying a curable resin on a base to form a resin film; providing the resin film with protrusions and recesses; and curing the resin film with protrusions and recesses. The inventors found that the resin film needs to be cured at the time of imprinting the protrusions and recesses thereon in order that the resin film is formed to be uniform in thickness and provided with high-accurately formed protrusions and recesses by a conventional method. Then the inventors found the followings. When a resin film is applied on a base, its viscosity is adjusted to be relatively low, thereby forming a resin film with a uniform thickness on a base. When protrusions and recesses are imprinted on the resin film, the resin film needs to have a relatively high viscosity so as not to lose the formed protrusions and recesses, and as a result, nanoimprint with high accuracy can be achieved without performing the UV radiation simultaneously at the time of the imprinting of the protrusions and recesses. Further, even if the base contains a UV-absorbing component, the resin film can be cured by being irradiated with UV light from the top side-surface thereof. As a result, the above-mentioned problems have been admirably solved, leading to completion of the present invention.

The present invention is a production method of a nanoimprint film formed on a base, the nanoimprint film having a surface with nano sized protrusions and recesses formed thereon, the production method including:

a first step of applying a UV-curable resin on a base containing a UV-absorbing component to form a film;

a second step of irradiating the film with UV light from a top-side surface of the film to form a semi-cured film;

a third step of imprinting nanosized protrusions and recesses on the semi-cured film to form a film having a surface with protrusions and recesses formed thereon; and a fourth step of curing the film with protrusions and recesses to form a nanoimprint film.

The production method of the present invention is mentioned below.

The nanoimprint film produced by the present invention has a surface with nanosized protrusions and recesses formed thereon. In the present description, the term "nanosized protrusions and recesses" means that a distance between peaks of adjacent protrusions is in a nanometer size, specifically, 1 nm or larger and smaller than 1000 nm. Preferably, the distance is not larger than the lower limit of a visible light wavelength, specifically, 380 nm or smaller. As a result, for example, a nanoimprint film capable of reducing light reflected on the display surface of the display device can be provided.

The production method of the nanoimprint film of the present invention includes the first step of applying a UV-curable resin on a base containing a UV-absorbing component to form a film. The term "UV light" used herein means electromagnetic waves in the wavelength range of 1 to 400 nm, and the UV-absorbing component of the present invention has an absorption maximum in the vicinity of this wavelength range (1 to 420 nm). The production method can be particularly suitably used when the base contains a UV-absorbing component and therefore has a UV-blocking property. The UV-blocking property is improved when a maximum wavelength of UV light corresponds to the absorption maximum wavelength of the UV-absorbing component. According to the present invention, in the above-mentioned first step, the UV-curable resin is applied on such a base to form a film. It is preferable that the applied resin is prepared to have a viscosity low enough to give a film with a uniform thickness.

The production method of the present invention includes the second step of irradiating the film with UV light from a top-side surface thereof to form a semi-cured film. This UV radiation from the top-side surface of the film allows an increase in viscosity of the film on the base, and further the accuracy of imprinting the protrusion and recess on the film surface in the next step can be dramatically increased. According to imprinting involving UV radiation, thermal expansion, thermal contraction, and the like are less likely to be taken into consideration, compared to imprinting involving thermal curing. Further, the absence of heating and cooling shortens the time taken to perform this step.

The production method of the present invention includes the third step of imprinting nanosized protrusions and recesses on the semi-cured film to form a film having a surface with protrusions and recesses formed thereon. In this step, the size of the protrusion and recess of the nanoimprint film is specified. In the third step, it is preferable that the mold is pressed to the film surface, thereby imprinting the protrusions and recesses on the film. Use of the mold permits easy imprinting process. The mold in the present description is not especially limited to one made of a metal material as long as it can provide the film surface with nanosized protrusions and recesses.

The production method of the present invention includes the fourth step of curing the film with protrusions and recesses to form a nanoimprint film. In this step, the protrusions and recesses transferred by the mold are fixed and formation of the nanoimprint film is completed. In the fourth step, although it is preferable that the nanoimprint film is irradiated with UV light from the top-side surface thereof as in the second step, heating may be employed when a thermo-curable resin is used as the resin. Alternatively, radiation of light in a visible light wavelength range may be employed when a resin curable under light other than UV light, such as visible light, is used as the resin. Further, heating and light radiation may be both used. By simultaneously performing heating and light radiation, the curing time can be shortened. The term "visible light" used herein means electromagnetic waves in the wavelength range of 380 to 780 nm.

The production method of the present invention is not especially limited and it may or may not include other steps as long as it essentially includes the above-mentioned steps.

Preferable embodiments of the production method of the present invention are mentioned in detail below.

When the mold is used for the imprinting process and when the mold includes a UV-blocking material, the present invention can be particularly preferably employed. The term "light-blocking" means reflection or absorption of light. In the present invention, there is no need to irradiate the film surface with UV light simultaneously at the time of the imprinting process, and UV-blocking materials may be used for the mold. Metals easy to process such as aluminum, tantalum, titanium, and silicon may be used, and for example, as compared with use of expensive quartz, production costs can be decreased. Use of such metals easy to process allows easy production of nanoimprint films with high-accurately-formed protrusions and recesses.

It is preferable that the mold is a cylindrical body having an outer circumference surface with nanosized protrusions and recesses formed thereon, and in the third step, the mold is pressed to the surface of the semi-cured film while being rotated, thereby continuously forming the nanosized protrusions and recesses on the surface of the semi-cured film. The present invention is directed to a technology of providing a surface treatment for the film. For example, it is preferable in production efficiency that a film is fed from a roll, and the film surface is continuously subjected to the imprinting process. So it is efficient that a cylindrical body having an outer circumference surface with nanosized protrusions and recesses formed thereon is used as a member for the imprinting process, and the mold is pressed to the film surface while being rotated, thereby imprinting the protrusions and recesses on the film surface. According to this method of rotating the cylindrical mold roller, seamless surface structures can be formed on the film surface. Molds having nanosized protrusions and recesses high-accurately formed on its surface can be obtained, for example, by anodizing and etching, EB (electron beam) drawing, EB lithography, and stepper exposure. The protrusions and recesses of the cylindrical body preferably have a conical or pyramid shape. Thus-obtained protrusions and recesses allow light incident on the display surface of a display device to gradually change its refractive index at a constant rate.

It is preferable that the base includes a supporting member containing a UV-absorbing component and a polarizer. The base includes a polarizer containing iodine, and so the nanoimprint film obtained in the present invention can be used as an anti-reflection film to be disposed on the display surface of an LCD surface. Further, the supporting member contains a UV-curable component and therefore protects the polarizer.

The present invention is a display device including a nanoimprint film produced by the production method of the present invention on a display surface thereof. The display device including the nanoimprint film produced by the production method of the present invention on the display surface thereof is excellent in low reflectance and is less likely to reflect ambient light. Examples of the display device of the present invention include CRTs, LCDs, PDPs, and EL display devices.

The present invention is a display device including a nanoimprint film formed on a base, the nanoimprint film having a surface with nano sized protrusions and recesses formed thereon, wherein the base contains a UV-absorbing component, and the nanoimprint film is obtained by being cured only by UV radiation from a top-side surface thereof. The nanoimprint film of the display device of the present invention is made of a material curable by UV light, and the base on which the nanoimprint film is formed contains an UV-absorbing component. Accordingly, when such a nanoimprint film is obtained by being cured by UV radiation from the bottom-side surface thereof, the nanoimprint film is hard to show excellent qualities. In contrast to this, the display device of the present invention includes a nanoimprint film formed only by UV radiation from the top-side surface thereof, and so the resulting film can be excellent in quality and low reflectivity. The base itself has a UV-absorbing function, and this leads to a reduction in thickness of the member constituting the display surface of the display device. Thus, the display device of the present invention includes the member excellent in UV-absorbing function and low reflectance on the display surface thereof.

The present invention is a liquid crystal display device including a pair of substrates and a liquid crystal layer interposed therebetween, wherein on a display surface of one of the pair of substrates, a base; and a nanoimprint film formed on the base and having a surface with protrusions and recesses formed thereon are disposed, and the base includes a supporting member containing a UV-absorbing component and a polarizer, and the nanoimprint film is obtained by being cured only by UV radiation from a top-side surface thereof. As mentioned above, the polarizing plate, which is usually disposed in the LCD device, includes a base containing an UV-absorbing component in view of protection of the polarizer. The nanoimprint film of the LCD device of the present invention includes a material curable by UV radiation, and the base on which the nanoimprint film is formed contains a UV-absorbing component. Accordingly, when such a nanoimprint film is obtained by being cured by UV radiation from the bottom-side surface thereof, the nanoimprint film is hard to show excellent qualities. In contrast to this, the LCD device of the present invention includes a nanoimprint film formed by only UV radiation from the top-side surface thereof, and so the resulting film can be excellent in quality and low reflectivity. The base itself has a UV-absorbing function, and this leads to production of a polarizing plate with a small thickness. Thus, the LCD device of the present invention includes a polarizing plate that has a small thickness and that is excellent in UV-absorbing function and low reflectance.

EFFECT OF THE INVENTION

According to the production method of the nanoimprint film of the present invention, UV nanoimprint excluding bottom-side exposure can be employed, and so even if an UV-absorbing base on which a nanoimprint film material is applied is used, nanoimprint films with high-accurately formed protrusions and recesses can be produced easily.

BEST MODES FOR CARRYING OUT THE INVENTION

The present invention is mentioned in more detail below with reference to drawings showing Embodiments, but not limited only thereto.

Embodiment 1

Embodiment 1 shows an example of the production method of the nanoimprint film of the present invention. FIG. 1 is a schematic view showing production steps of a nanoimprint film produced in Embodiment 1. The production method of the nanoimprint film of Embodiment 1 is mentioned below step by step.

Preparation of Base

A base on which a nanoimprint film is to be formed is prepared first. The base of Embodiment 1 corresponds to a polarizing plate used in LCD devices and the like. FIG. 2 is a cross-sectional view schematically showing the polarizing plate of Embodiment 1. As shown in FIG. 2, a polarizing plate (base) 20 includes a multi-layer structure composed of a first TAC film 21, which is one supporting member, a PVA film 22, which is a polarizer, and a second TAC film 23, which is the other supporting member. The PVA film 22 is stretched in the longitudinal and/or transverse directions and iodine is adsorbed to the PVA film 22 surface and oriented in the stretching direction. At least one of the first TAC film 21 and the second TAC film 23 contains a UV-absorbing agent, and when exposed to UV light in the wavelength range of 1 to 400 m, the first TAC film 21 or the second TAC film 23 absorbs 50% or higher of a radiation amount ($J/cm^2$) of the UV light at a wavelength corresponding to the absorption maximum of the first TAC film 21 or the second TAC film 23. Preferably, both of the first TAC film 21 and the second TAC film 23 contain a UV-absorbing agent, and both absorb it at the above-mentioned proportion. Examples of the UV-absorbing agent include: organic compounds such as benzophenone compounds, benzotriazole compounds, benzoate compounds, and triazine compounds; and metal oxides such as silicon oxide, titanium oxide, and tin oxide. Such UV-absorbing agents can exist in the TAC film in the form of fine particles, for example. As shown in FIG. 1, the polarizing plate 20 is wound to form a base film roll 11, and this roll 11 is rotated to feed the polarizing plate 20.

Application (First Step)

First, the base film roll 11 is rotated to feed the base film 20 in the form of a belt in the direction shown by the arrow in FIG. 1. Then the base film 20 is coated with a resin material with a die coater 12, thereby forming a film 30. Slit coater, gravure coater, and the like may be employed instead of the die coater.

The coated resin material of Embodiment 1 is composed of a resin curable under UV radiation (a resin having a UV-curing property). Used may be monomers initiating polymerization by UV absorption, monomers not initiating polymerization by UV absorption alone but including a polymerization initiator that can become an active species by UV absorption to initiate polymerization. Photopolymerization initiators, photosensitizers, and the like may be appropriately added to the monomers. The photopolymerization reaction in this case includes radical polymerization, cationic polymerization, and the like.

According to radical polymerization, for example, monofunctional (meth)acrylates and/or polyfunctional (meth)acrylates are used as a polymerizable monomer component, and photopolymerization initiators initiate radical reaction.

Examples of the monofunctional (meth)acrylates include (meth)acrylates containing a substituent such as methyl, ethyl, propyl, butyl, amyl, 2-ethylhexyl, octyl, nonyl, dodecyl, hexadecyl, octadecyl, cyclohexyl, benzyl, methoxy ethyl, butoxy ethyl, phenoxyl ethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyl tetrahydrofurfuryl, caprolactone-modified tetrahydrofurfuryl, isobornyl, dicyclopentanyl, dicyclopentenyl, and dicyclopentenyloxy ethyl.

Examples of the polyfunctional (meth)acrylates include (meth)acrylates including a substituent such as 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, and polypropylene glycol.

Examples of the photopolymerization initiators include benzoin isobutyl ether, 2,4-diethylthioxanthone, 2-isopropylthioxanthone, benzyl, 2,4,6-trimethylbenzoyl diphenyl phosphine oxide, 2-benzyl-2-dimethylamino-1-(4-morpholinophenyl)-butane-1-on e, bis(2,6-dimethoxybenzoyl)-2,4,4-trimethylpentyl phosphine oxide.

Examples of the photosensitizer include trimethylamine, methyldimethanolamine, triethanolamine, p-diethylamino acetophenone, ethyl p-dimethylaminobenzoat, isoamyl p-dimethylaminobenzoate, N,N-dimethylbenzylamine, and 4,4'-bis(diethylamino)benzophenone.

According to cationic polymerization, epoxy resins including cationic photopolymerization initiators may be used for example. Examples of the epoxy resins include bisphenol A-epichlorohydrin, long-chain aliphatic, glycidyl ester, glycidyl ether, alicyclic, brominated, and heterocyclic epoxy resins. Examples of the cationic photopolymerization initiators include sulfonium salts, iodonium salts, and diazonium salts.

The resin material to be applied in this case preferably has a viscosity low enough to form a film 30 with a uniform thickness over the base film 20. For example, it is preferable that the viscosity of the resin material is adjusted to a proper value with an organic solvent and the like and then applied. The resin material is preferably a material the viscosity of which can be easily adjusted by UV light 13-radiation. This further improves the production efficiency. The viscosity is preferably in a range of $1\times10^{-3}$ to 1 (Pass) to form a uniform film. When the material with a viscosity in such a range is used for the film, a film with a uniform thickness and excellent qualities can be produced.

Semi-Curing Step (Second Step)

Then the film 30 is irradiated with the UV light 13 to increase its viscosity. The UV light 13 can be emitted from a light source such as a fluorescent lamp, a low pressure mercury lamp, a high pressure mercury lamp, a xenon lamp, and a metal halide lamp. The kind of the light source can be appropriately determined in accordance with the material to be used. The base film 20 of Embodiment 1 has a property of absorbing the UV light 13, and so in this step, the UV light 13 is radiated from the top-side surface of the film 30. This treatment can be performed at room temperatures. The UV light 13—radiation allows photopolymerization to proceed in the UV-curable resin film, and curing thereof also proceeds, resulting in increase in viscosity of the film 30. In this step, the film 30 is semi-cured without being completely cured. The film 30 is cured to such a degree that 40 to 60% by weight of the entire resin is cured so that the next imprinting step is well provided. A preferable radiation amount of the UV light 13 depends on the material to be used, and for example, based on the radiation amount in the fourth step, i.e., 300 to 3000 J/cm$^2$, the radiation amount in this step is appropriately determined. It is preferable that the material of the film 30 is one the viscosity of which can be controlled by the radiation amount of UV light. It is preferable that the material of the film 30 is curable by UV light in a certain amount range. When an aerobic material is used for the film 30, it is preferable that the UV light 13-radiation is performed under nitrogen atmosphere.

Imprinting Step (Third Step)

The base film 20 passes through a pinch roller 14 and then moves halfway around a cylindrical mold roller 15 along its outer circumference surface. At this time, the film 30 on the base film 20 is in contact with the outer circumference surface of the mold roller. The mold roller 15 is a cylindrical body having an outer circumference surface on which a plurality of protrusions and recesses are formed. The protrusions and recesses each have a substantially conical or pyramid shape, where a distance between peaks of adjacent protrusions is 50 nm to 500 nm and a depth of a recess is 50 nm to 1000 nm, preferably 50 nm to 500 nm. The depth of the recess on the mold roller surface might be different from the height of the protrusion of the obtained nanoimprint film, depending on the kind of a demolding agent that is used for enhancement of demolding property after the imprinting. The cylindrical body has 250 mm in inner diameter, 260 mm in outer diameter, and 400 mm in length. Such a mold roller 15 can be prepared by cut-polishing a cylindrical aluminum tube formed by extruding, and alternately repeating three times anodization and etching for the cut-polished flat surface. The mold roller 15 has seamless nanostructures because the anodization and the etching are performed in the same process for the outer circumference surface of the tube. Use of this mold roller allows seamless nanosized protrusions and recesses to be continuously imprinted on the film 30.

A cylindrical pinch roller 16 is arranged to face the outer circumference surface of the mold roller 15 at the position where the base film 20 is in contact with the outer circumference surface of the mold roller 15. At this position, the pinch roller 16 presses the film 30 to the mold roller 15, and as a result, the film 30 is embossed with the surface shape of the mold roller 15. Thus, a film 40 with protrusions and recesses formed on its surface is obtained. The base film 20 has a width smaller than the length of the mold roller 15 and the pinch roller 16 so that the mold roller 15 and the pinch roller 16 uniformly sandwich the base film 20. The pinch roller 16 is a rubber roller. After the protrusions and recesses are imprinted on the film 30 surface, the base film 20 moves along the outer circumference surface of the mold roller 15 and then passes through the pinch roller 17 to undergo the next step.

Curing (Fourth Step)

Then the film 40 with the nanosized pattern surface undergoes a curing treatment. In Embodiment 1, UV light 18-radiation is employed as the curing treatment. The radiation amount of the UV light in the curing treatment needs to be appropriately determined depending on a material to be irradiate with UV light, but usually in a range of 300 to 3000 (mJ/cm$^2$). UV light radiation is preferably employed as the curing treatment as in the second step because the film 40 is made of the UV-curable material. In Embodiment 1, the base film 20 has a UV-absorbing property, and as in the second step, the UV light 18 is radiated from the top-side surface of the film 40. If an anaerobic material is used for the film 40, it is preferable that the radiation of the UV light 18 is performed under nitrogen atmosphere.

The kind of the curing treatment is not especially limited in the fourth step. For example, heating may be employed when a thermocurable material is used for the film 40. Alternatively, radiation of visible light may be employed when a visible light-curable material is used for the film 40. Accordingly, in the fourth step, these processes may be used in a combination, and it is preferable that the material for the film 40 has both UV-curable property and thermocurable property in Embodiment 1. For example, employed may be a combination use of UV light radiation and heating, a combination use of visible light radiation and heating, and radiation of light in a wavelength range corresponding to both UV light and visible light. As a result, the time in this step can be shortened.

As a result of the curing of the film 40, the protrusions and recesses formed on the surface can be fixed. Thus, formation of the nanoimprint film is completed.

Then, a lamination film is unwounded from a lamination roll 51 and pressed to the film 40 by a pinch roller 52, and then attached to the top-side surface of the film 40. Finally, a laminate sheet 50 composed of the base film, the nanoimprint film, and the lamination film is rolled up to obtain a laminate sheet roll 53. The lamination film can protect the sheet surface against dust and damages.

The structure of the nanoimprint film produced in Embodiment 1 is mentioned in detail. FIG. 3 is a cross-sectional view schematically showing the nanoimprint film produced in Embodiment 1. FIG. 3(a) shows a cross-sectional structure of the nanoimprint film. FIG. 3(b) shows refractive indexes of light incident on the nanoimprint film. As shown in FIG. 3(a), the nanoimprint film 40 produced in Embodiment 1 is composed of a bottom portion 41 free from the protrusions and recesses and a portion 42 having a surface with nanosized protrusions and recesses formed thereon. Each of the protrusions and recesses has a tapered pyramid or conical shape. In the portion 42, the distance between peaks of the adjacent protrusions is 50 nm to 500 nm. When this distance is in such a range, the reflectance on the top-side surface of the film can be largely decreased. The height of the protrusion is 50 nm to 500 nm. If the height of the protrusion is in such a range, the reflectance of the top-side surface of the film can be more largely decreased.

The principle why the nanoimprint film 40 produced in Embodiment 1 can provide low reflection is outlined below. When light waves travel from a medium to another, refraction occurs at the boundary between the media. The refraction degree is determined depending on refractive indexes of the media. For example, air has a refractive index of about 1.0 and a resin has a refractive index of about 1.5. In Embodiment 1, as mentioned above, each of the protrusions and recesses 42 formed on the nanoimprint film 40 surface has a pyramid or conical shape, and specifically, the protrusions and recesses 42 are each tapered with diminishing width toward the distal end. As shown in FIG. 3(b), at the interface between air and the nanoimprint film layer, the refractive index can be regarded to continuously and gradually increase from about 1.0 of the refractive index of air to the refractive index of the material for the film (about 1.5 of resin). The reflection amount of light is proportional to a difference in refractive index between the media. So under the condition where the refractive interface almost no exists, the light reflectance on the top-side surface of the film can be significantly decreased. Such surface structures are commonly called "moth-eye structures."

FIG. 4 is a cross-sectional view schematically showing a polarizing plate including the nanoimprint film produced in Embodiment 1. As shown in FIG. 4, the polarizing plate (laminate sheet) 50 has a multi-layer structure composed of the first TAC film 21, which is one supporting member, the PVA film 22, which is a polarizing element, the second TAC film 23, which is the other supporting member, and the nanoimprint film 40 having the nanosized protrusions and recesses. This polarizing plate 50 is disposed on the display surface of an LCD device so that the nanoimprint film is positioned on the display surface side, and thereby the LCD device can reduce reflection of light on the display window. According to a specific configuration of the LCD device, for example, an array substrate, an LC layer, and a color filter substrate are disposed in this order toward the display surface, and a polarizer is disposed on surfaces of the respective array and color filter substrate. The nanoimprint film used as an anti-reflection film is attached to the top-side surface of the polarizing plate on the color filter substrate. The TAC films 21 and 23, which are bases, have an UV-absorbing function, and the polarizing plate 50 has a small thickness. As a result, the total thickness of the entire device can be decreased. Thus, the LCD device produced in Embodiment 1 can be excellent in polarizer protection functions and low reflectivity and includes a thinner polarizing plate (member constituting the top-side surface thereof).

The present application claims priority to Patent Application No. 2008-076473 filed in Japan on Mar. 24, 2008 under the Paris Convention and provisions of national law in a designated State, the entire contents of which are hereby incorporated by reference.

BRIEF DESCRIPTION OF DRAWINGS

FIG. 3(a) shows a cross-sectional structure of the nanoimprint film.

FIG. 3(b) shows refractive indexes of light incident on the nanoimprint film.

EXPLANATION OF NUMERALS AND SYMBOLS

Figure 1:
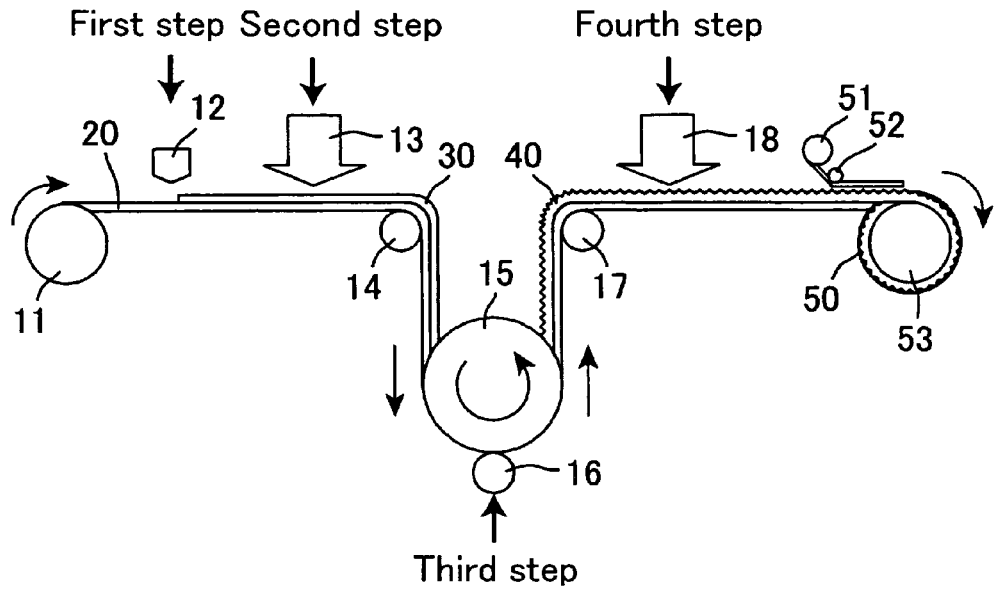
FIG. 1 is a schematic view showing production steps of a nanoimprint film produced in Embodiment 1.
Figure 2:
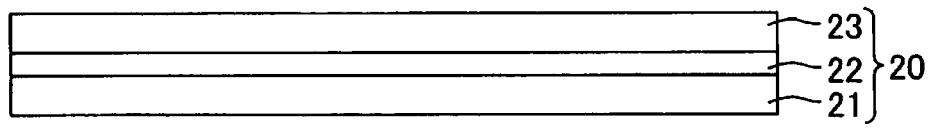
FIG. 2 is a cross-sectional view schematically showing a polarizing plate used in Embodiment 1.
Figure 3:
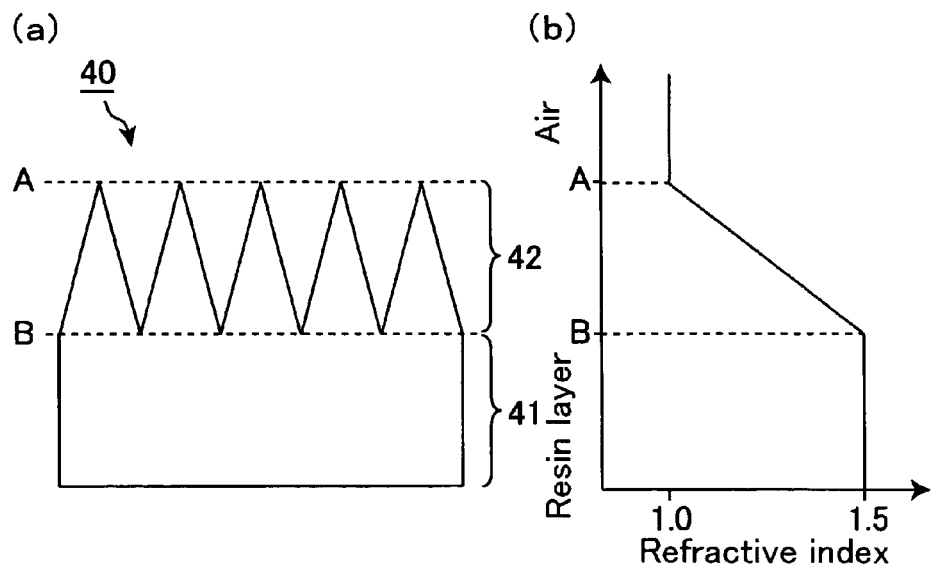
FIG. 3 is a cross-sectional view schematically showing the nanoimprint film produced in Embodiment 1.
Figure 4:
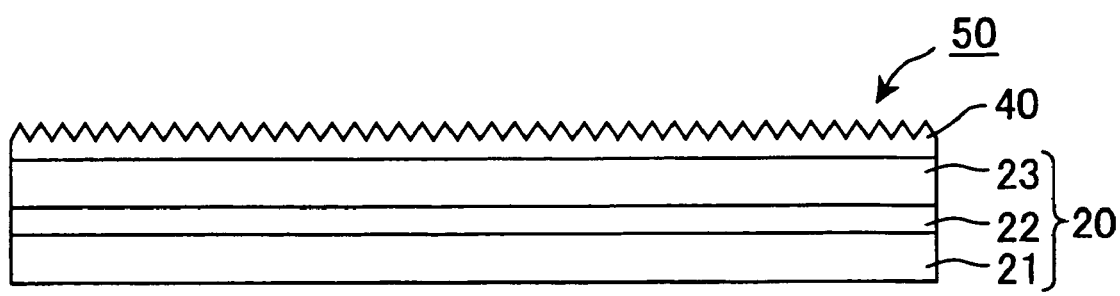
FIG. 4 is a cross-sectional view schematically showing a nanoimprint film-including polarizing plate produced in Embodiment 1.

11: Base film roll
12: Die coater
13: UV light (Second step)
14, 16, 17, 52: Pinch roller
15: Mold Roller
18: UV light (Fourth step)
20: Base film, polarizing plate (base)
21: First TAC film
22: Polarizer
23: Second TAC film
30: Film (applied resin in the first step)
40: Film (having protrusions and recesses in the third step), nanoimprint film 41: Bottom Portion
42: Protrusion-recess portion
50: Laminate sheet, polarizing plate
51: Lamination film roll
53: Laminate sheet roll

The invention claimed is:

1. A production method of a nanoimprint film formed on a base, the nanoimprint film having a top-side surface with nanosized protrusions and recesses formed thereon, a distance between peaks of adjacent protrusions of the nanoimprint film being 500 nm or smaller, the production method comprising:
   a first step of applying a UV-curable resin on a top-side surface of a base containing a UV-absorbing component to form a film;
   a second step of irradiating the film upstream of a mold with UV light applied to a top-side surface of the film made of UV-curable resin to form a semi-cured film;
   a third step of imprinting nanosized protrusions and recesses on the semi-cured film by pressing the mold to the top-side surface of the semi-cured film after irradiating the film to form the semi-cured film having a surface with protrusions and recesses formed thereon; and
   a fourth step of curing the semi-cured film with protrusions and recesses to form a nanoimprint film.

2. The production method according to claim 1, wherein in the fourth step, the film is further irradiated with UV light applied to the top-side surface of the film made of UV-curable resin thereof to be cured.

3. The production method according to claim 1, wherein the mold includes a UV-blocking material.

4. The production method according to claim 1, wherein the mold is a cylindrical body having an outer circumference surface with nanosized protrusions and recesses formed thereon, and
in the third step, the mold is pressed to the surface of the previously semi-cured film while being rotated, thereby continuously forming the nanosized protrusions and recesses on the surface of the semi-cured film.

5. The production method according to claim 1, wherein the base includes two supporting members each containing a UV-absorbing component and a polarizer sandwiched between the two supporting members.

6. A display device comprising a nanoimprint film produced by the production method according to claim 1 on a display surface thereof.

7. A display device, comprising:
   a nanoimprint film formed on a base, the nanoimprint film having a surface with nanosized protrusions and recesses formed thereon, wherein
   the base contains a UV-absorbing component, and
   the nanoimprint film is obtained by being cured by UV radiation applied to only a top-side surface of the film having the nanosized protrusions and recesses formed thereon.

8. A liquid crystal display device, comprising:
   a pair of substrates and a liquid crystal layer interposed therebetween, wherein on a display surface of one of the pair of substrates,
   a base; a nanoimprint film formed on the base and having a surface with protrusions and recesses formed thereon are disposed, and
   the base includes a supporting member containing a UV-absorbing component and a polarizer, and
   the nanoimprint film is obtained by being cured by UV radiation applied to only a top-side surface of the film having nanosized protrusions and recesses formed thereon.

9. The production method according to claim 2, wherein the mold includes a UV-blocking material.

10. The production method according to claim 2, wherein the mold is a cylindrical body having an outer circumference surface with nanosized protrusions and recesses formed thereon, and
in the third step, the mold is pressed to the surface of the previously semi-cured film while being rotated, thereby continuously forming the nanosized protrusions and recesses on the surface of the semi-cured film.

11. The production method according to claim 3, wherein the mold is a cylindrical body having an outer circumference surface with nanosized protrusions and recesses formed thereon, and
in the third step, the mold is pressed to the surface of the previously semi-cured film while being rotated, thereby continuously forming the nanosized protrusions and recesses on the surface of the semi-cured film.

12. The production method according to claim 1, wherein the nanoimprint film has nanosized protrusions and recesses only on the top-side surface.

* * * * *